(12) United States Patent
Beck

(10) Patent No.: US 7,708,125 B2
(45) Date of Patent: May 4, 2010

(54) PISTON-CYLINDER ASSEMBLY

(75) Inventor: Hubert Beck, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 14 days.

(21) Appl. No.: 11/238,851

(22) Filed: Sep. 30, 2005

(65) Prior Publication Data

US 2006/0070836 A1    Apr. 6, 2006

(30) Foreign Application Priority Data

Oct. 1, 2004  (DE) .................. 10 2004 047 899

(51) Int. Cl.
*F16F 9/00*    (2006.01)

(52) U.S. Cl. ................... 188/322.19; 188/314

(58) Field of Classification Search ............ 188/322.16, 188/322.19, 321.11, 322.21, 322.2, 314, 188/315, 299.1; 262/64.28; 285/124.5, 382, 285/351, 305

See application file for complete search history.

(56) References Cited

U.S. PATENT DOCUMENTS

| | | | | |
|---|---|---|---|---|
| 2,091,830 A | * | 8/1937 | Peteler | 188/278 |
| 2,965,074 A | * | 12/1960 | Williamson | 188/269 |
| 3,088,726 A | | 5/1963 | Dangauthier | |
| 5,400,880 A | * | 3/1995 | Ryan | 188/314 |
| 5,533,586 A | * | 7/1996 | Thompson | 180/193 |
| 5,655,796 A | * | 8/1997 | Bartholomew | 285/305 |
| 5,797,594 A | * | 8/1998 | Sekine et al. | 267/64.17 |
| 6,923,462 B2 | | 8/2005 | Tantius | |
| 2002/0175454 A1 | * | 11/2002 | Huang | 267/64.28 |
| 2003/0067162 A1 | * | 4/2003 | Welsh et al. | 285/305 |
| 2003/0137122 A1 | * | 7/2003 | Tantius | 280/124.155 |

FOREIGN PATENT DOCUMENTS

| | | |
|---|---|---|
| AT | 35 445 | 3/1985 |
| DE | 198 23 023 | 12/1999 |
| DE | 102 02 350 | 5/2003 |
| DE | 10 2004 034 725 | 3/2005 |

\* cited by examiner

*Primary Examiner*—Bradley T King
*Assistant Examiner*—James K Hsiao
(74) *Attorney, Agent, or Firm*—Cohen Pontani Lieberman & Pavane LLP

(57) ABSTRACT

A piston-cylinder assembly has a working piston attached to a piston rod and dividing a working cylinder into two working spaces. An external reservoir partially filled with damping medium is provided outside the piston-cylinder assembly and is connected to one of the working spaces by a connecting pipe. The piston-cylinder assembly is provided with a stepped bore for receiving the connecting pipe, in the larger-diameter part of which a seal is held in place by the connecting pipe.

11 Claims, 3 Drawing Sheets

PISTON-CYLINDER ASSEMBLY

BACKGROUND OF THE INVENTION

1. Field of the Invention

The invention relates to a piston-cylinder assembly, in which a working piston is attached to a piston rod and divides a working cylinder into two working spaces. An external reservoir partially filled with damping medium is provided outside the piston-cylinder assembly and is connected to one of the working spaces by a connecting pipe.

2. Description of the Related Art

Piston-cylinder assemblies, in which the vibration damper comprises a container with an external expansion space connected to the container by a connecting pipe, are known (e.g., DE 102 02 350 C1). The connecting pipe is connected permanently and in a leak-tight manner both to the external reservoir and to the container itself by threaded pipe fittings.

Piston-cylinder assemblies, in which a reservoir partially filled with oil is located externally for space reasons, are also known (e.g., AT 35 445 B). This external reservoir can be attached directly to the piston-cylinder assembly, but it can also be located somewhere else and connected to the piston-cylinder assembly by a flow connection. What is involved here is a gas pressure damper for motorcycles, in which the external reservoir is designed as a gas pressure accumulator, which compensates for the volume of the piston rod. The units are connected to each other by a high-pressure hose with ring-type nipple connections known in the industry, through each of which a banjo bolt passes. This type of connection is bulky and uneconomical and can be disassembled by unauthorized persons. Disassembly at this point makes a piston-cylinder assembly unusable, because the pressurized damping medium escapes.

Additional piston-cylinder assemblies, in which a level-controlled MacPherson strut unit is provided with an external reservoir located outside the MacPherson strut unit, are also known (U.S. Pat. No. 5,797,594). The external reservoir in this exemplary embodiment is used as a low-pressure reservoir, but it is possible to tamper with the pressurized unit. Another source of difficulty is the brazed or welded joint on the assembly side. Pipe connections made by brazing or welding must be inspected for leaks before installation in the vehicle, which increases costs. The cycle times of the assembly process must also be longer, which makes this method of attaching external reservoirs unsuitable for mass production.

SUMMARY OF THE INVENTION

An object of the invention is therefore to create a piston-cylinder assembly in which a low-cost, compact, and reliable connecting pipe for connecting an externally located outer reservoir to a piston-cylinder assembly is provided. Additionally, the connecting pipe can be installed quickly and offers the best possible sealing. Moreover, the external reservoir cannot be removed by unauthorized persons.

To achieve this object, the invention provides a piston-cylinder assembly with a stepped bore for receiving a connecting pipe. In the larger-diameter part of the stepped bore a seal is installed, which is held in place by the connecting pipe.

The advantage here is that the external reservoir together with its connecting pipe can be easily attached to a piston-cylinder assembly in a short time, so that this type of connection is also suitable for mass production.

In accordance with the invention, the area of the connecting pipe held in the piston-cylinder assembly comprises an outer section with a smaller outside diameter and an inner section with a larger outside diameter. It is advantageous here for the inner section with the larger outside diameter to be formed or defined by an additional element and/or for the inner section with the larger outside diameter to be held in the piston-cylinder assembly in a press-fit fashion.

Another way of connecting the external reservoir in a technically simple manner is for the connecting pipe to be held in place in the piston-cylinder assembly in a positive connection fashion. It is advantageous here for the connecting pipe to be connected to the piston-cylinder assembly by at least one peened area and/or for the connecting pipe to be held with freedom of rotation in the piston-cylinder assembly.

According to another embodiment, the external reservoir parallels the working cylinder of the piston-cylinder assembly.

If the point where the connecting pipe is attached and the external reservoir are on different sides of the piston-cylinder assembly, the connection in the piston-cylinder assembly for the connecting pipe is provided diametrically opposite the external reservoir.

It is also provided that, if the external reservoir is part of a MacPherson strut unit of a vibration damper, it is designed to serve as the expansion reservoir, or that, if the external reservoir is part of a self-pumping hydrodynamic MacPherson strut unit, it is designed to serve as a low-pressure or high-pressure chamber.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred exemplary embodiments of the invention are illustrated schematically in the drawings.

DETAILED DESCRIPTION OF THE PRESENTLY PREFERRED EMBODIMENTS

Figure 1:
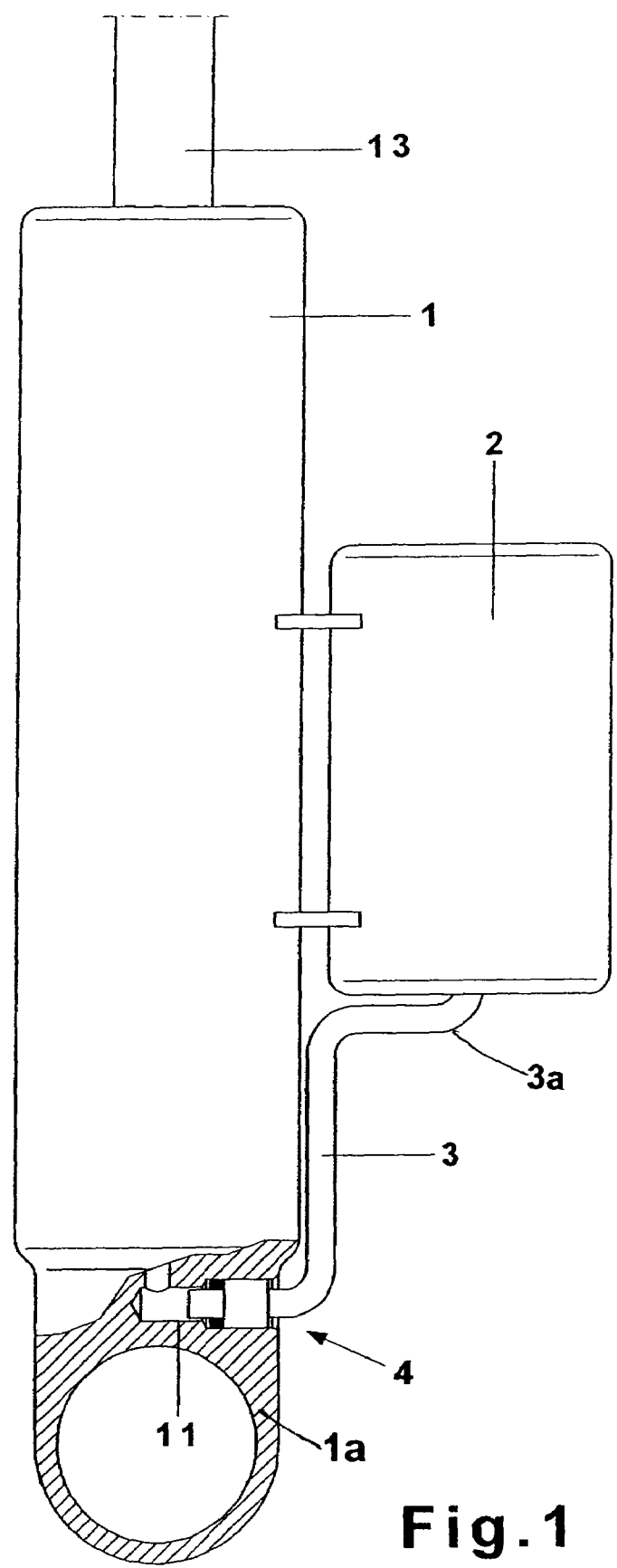
FIG. 1 shows a piston-cylinder assembly, part of which is shown in a cross-section view.
Figure 5:
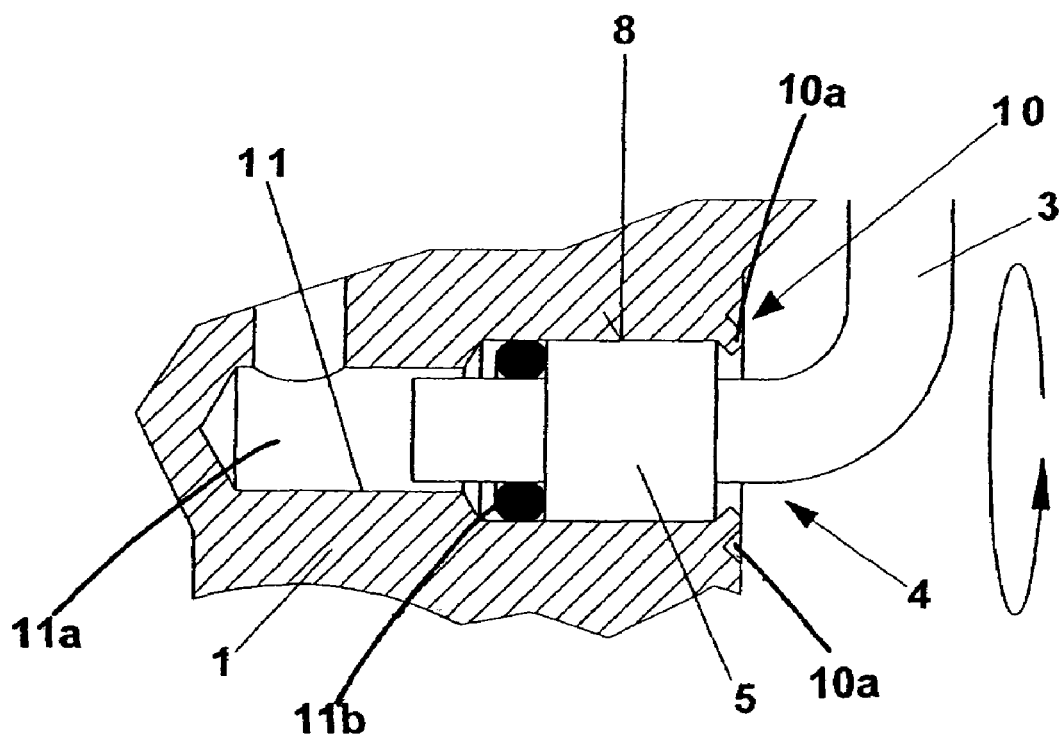

The piston-cylinder assembly 1 shown in FIG. 1 comprises a piston rod 13, which carries a damping piston dividing the working cylinder of the piston-cylinder assembly 1 into two working spaces. When the piston rod 13 is actuated, damping medium flows back and forth between the piston-cylinder assembly 1 and an external reservoir 2 via a connecting pipe 3. The connecting pipe 3 has a first end 3a connected to the external reservoir 2, and a second end or pipe joint 4 held in a stepped bore 11 of the main body 1a of the piston-cylinder assembly 1. As shown in FIG. 5, the stepped bore 11 comprises an inner bore 11a having a predetermined diameter, and an outer bore 11b having a diameter which is greater than the diameter of the inner bore 11a. The inner bore 11a and the outer bore 11b share one axis.

The external reservoir 2 is axially parallel to the piston-cylinder assembly 1, and the connecting pipe 3 extends over the shortest possible distance from the reservoir 2 to the stepped bore 11.

Figure 2:
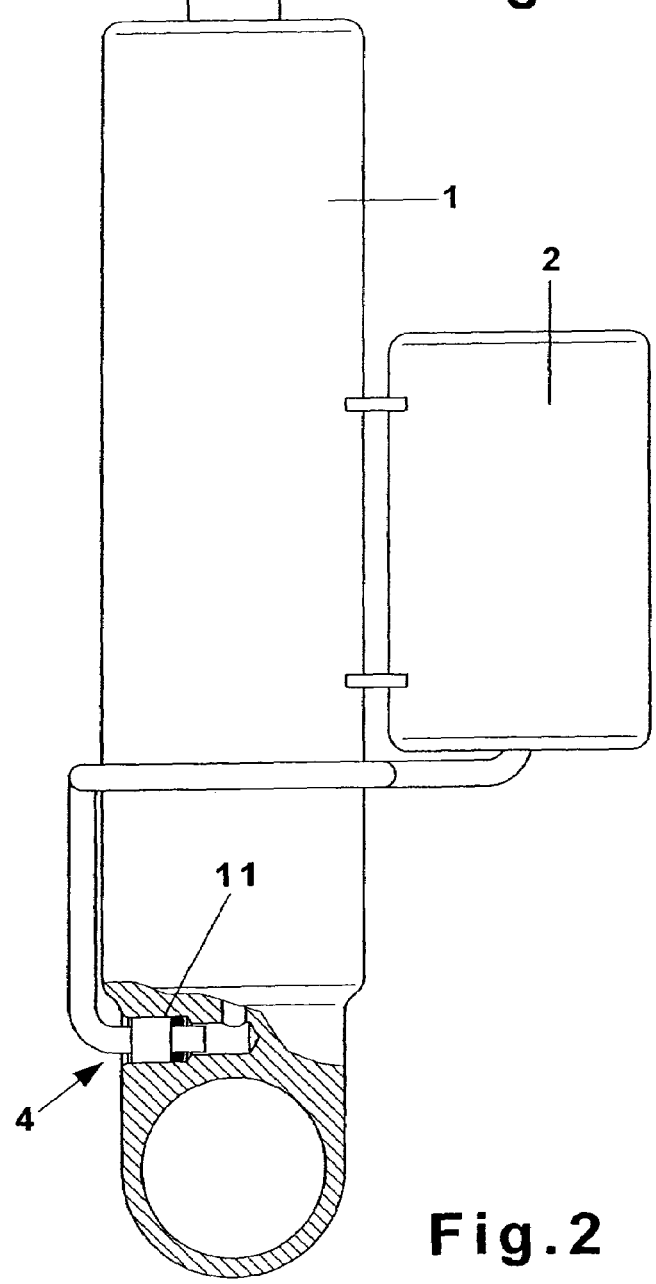
FIG. 2 shows another embodiment of a piston-cylinder assembly, part of which is shown in a cross-section view.

Like FIG. 1, FIG. 2 shows a piston-cylinder assembly 1 with an external reservoir 2, but, for technical reasons associated with the assembly process, the pipe joint 4 is located here on the side of the piston-cylinder assembly 1 diametrically opposite the external reservoir 2. To ensure that this type of connection is possible, the pipe joint 4 must be free to rotate in the stepped bore 11.

Figure 3:
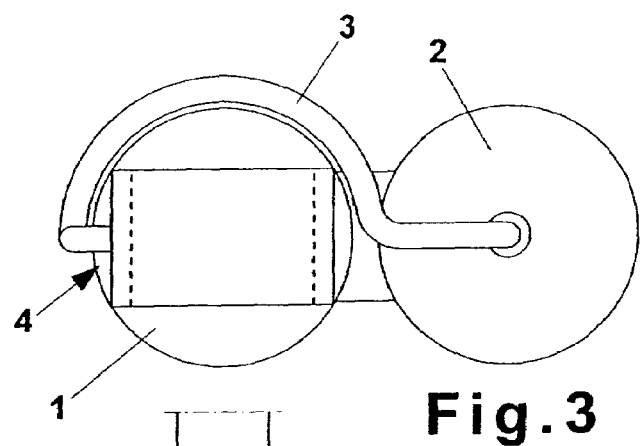
FIG. 3 shows a top view of the piston-cylinder assembly of FIG. 2.

FIG. 3 shows a top view of the piston-cylinder assembly 1 of FIG. 2, where the external reservoir 2 is rotationally offset from the pipe joint 4. The prefabricated external reservoir 2 with its connecting pipe 3 can be installed only if the pipe joint 4 can rotate with respect to the piston-cylinder assembly 1.

Figure 4:
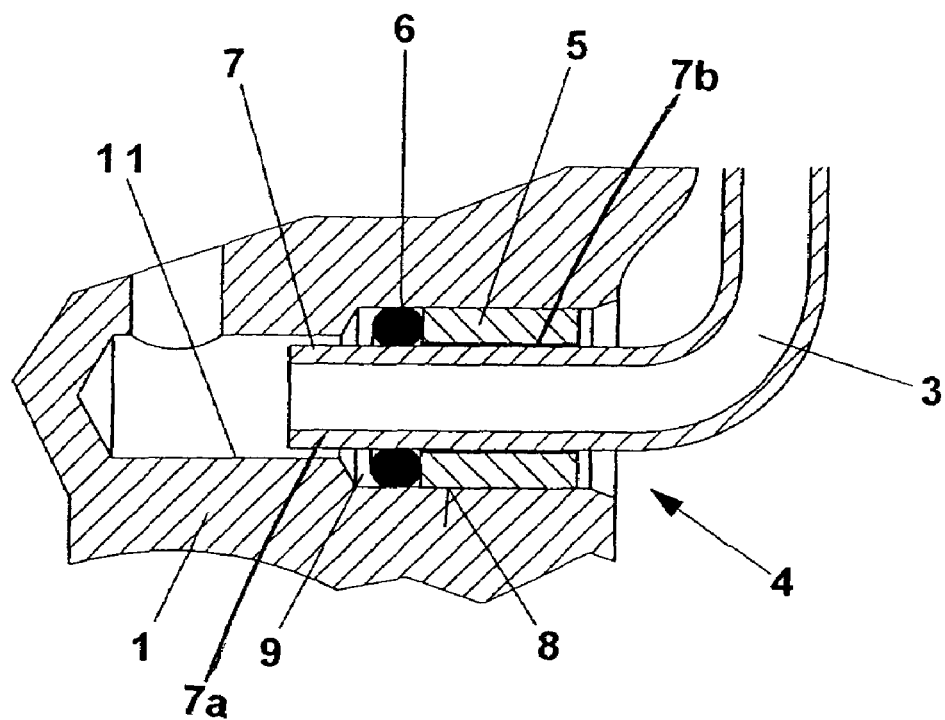
FIGS. 4 and 5 show cross sections of various methods for connecting the connecting pipe to a piston-cylinder assembly.

FIG. 4 shows a detailed view of the pipe joint 4, where a collar 5 is attached to the connecting pipe 3 by means of brazing or welding, for example, although other methods of attachment are conceivable. Thus, the connecting pipe 3 at its end 7 has an inner section 7a having a predetermined outside diameter, and an outer section 7b having an outside diameter which is larger than the outside diameter of the inner section 7a. The length of the outer section 7b is defined by the length of the collar 5. A seal 6 seals off the end 7 of the pipe against the stepped bore 11 of the piston-cylinder assembly 1. The larger diameter 8 of the outer bore 11b is determining with respect to the formation of a sealing chamber 9, which holds the seal 6. Because the sealing function is accomplished by the seal 6 at the end 7 of the connecting pipe, the joint between the collar 5 and the connecting pipe 3 does not have to be leak-tight; however, the joint must be able to transmit the forces necessary to hold the connecting pipe in place. The force which holds the pipe joint 4 in place is achieved in this embodiment by the press-fit of the collar 5 in the outer bore 11b of the piston-cylinder assembly 1. Because this pipe joint 4 is a press-fit, it cannot rotate and is therefore provided as a connection for the type of piston-cylinder assembly shown in FIG. 1.

FIG. 5 proposes a pipe joint 4 with freedom of rotation, which exists because the collar 5 is seated with a certain amount of play by the larger diameter 8 of the outer bore 11b and therefore can rotate with respect to the piston-cylinder assembly 1. The additional element 5 together with the connecting pipe 3 are held in place in this embodiment by a peened area 10. In FIG. 5, the peened area 10 is shown in the form of retaining tabs 10a which initially are parallel to the axis of the stepped bore 11. After the outer section 7b of the second end of the connecting pipe 3 is completely inside the outer bore 11b, the tabs 10a are peened inward to prevent the second end of the connecting pipe 3 from moving out of the stepped bore 11. As should be understood, the tabs are not limited to two. For example, one retaining tab could be employed to achieve a similar result. This kind of connection can therefore be used in the exemplary embodiment shown in FIG. 2.

Peened area 10 shown in FIG. 5 can also be provided for the embodiment shown in FIG. 4. This would make it possible for the joint to withstand even very high compression forces without fear that the press-fit will come apart.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder assembly having a working space, the assembly comprising:
    a main body having a stepped bore, the stepped bore comprising an inner bore having a first diameter and an outer bore having a second diameter larger than the first diameter;
    an external reservoir suitable to be partially filled with damping medium and positioned outside the main body;
    a connecting pipe connecting the external reservoir with the working space, the connecting pipe having an end positioned in the stepped bore; and
    a seal in the outer bore and held in place by the connecting pipe, wherein the bore is on a side of the main body which is diametrically opposite from the fully installed position of the external reservoir,
    the external reservoir and the connecting pipe are prefabricated as a single unit, wherein the single unit is configured so that the single unit must be in a position that is rotated from the fully installed position of the external reservoir about a longitudinal axis of the stepped bore when the end of the connecting pipe is installed into the stepped bore to avoid interference between the external reservoir and the main body,
    wherein in the fully installed position of the external reservoir opposite the stepped bore causes the end of the connecting pipe to be positioned in the bore such that the end of the connecting pipe cannot be removed from the bore without rotating the single unit about the longitudinal axis of the stepped bore.

2. The piston-cylinder assembly of claim 1, wherein the end of the connecting pipe comprises an inner section having an outside diameter, the inner section being received in the inner bore, and an outer section having an outside diameter larger than the outer diameter of the inner section, the outer section being received in the outer bore.

3. The piston-cylinder assembly of claim 2, wherein the diameter of the outer section of the end of the connecting pipe is defined by a collar, the at least one retaining tab extending over the collar.

4. The piston-cylinder assembly of claim 1, wherein the external reservoir parallels the main body of the piston-cylinder assembly.

5. The piston-cylinder assembly of claim 1, wherein the external reservoir is operable to serve as an expansion reservoir when the external reservoir is part of a MacPherson-type strut unit or vibration damper.

6. The piston cylinder assembly of claim 1 wherein the end of the pipe is positively held in the stepped bore by at least one peened retaining tab which is formed to extend over the bore.

7. A piston cylinder assembly having a working space, the assembly comprising:
    a main body having a bore;
    an external reservoir which can be partially filled with damping medium and positioned outside the main body;

a connecting pipe connecting the reservoir with the working space, the connecting pipe having an end received in the bore; and a seal held in the bore by the connecting pipe, wherein the bore is on a side of the main body which is diametrically opposite from the fully installed position of the external reservoir, the external reservoir and the connecting pipe are prefabricated as a single unit, wherein the single unit is configured so that the single unit must be in a position that is rotated from the fully installed position of the external reservoir about a longitudinal axis of the stepped bore when the end of the connecting pipe is installed into the stepped bore to avoid interference between the external reservoir and the main body wherein in the fully installed position of the external reservoir opposite the stepped bore causes the end of the connecting pipe to be positioned in the bore such that the end of the connecting pipe cannot be removed from the bore without rotating the single unit about the longitudinal axis of the stepped bore.

8. The piston cylinder assembly of claim 7 wherein the bore is a stepped bore comprising an inner bore with a first diameter and outer bore with a second diameter which is larger than the first diameter, the end of the connecting pipe comprising an inner section having an outside diameter, the inner section being received in the inner bore, and an outer section having an outside diameter which is larger than the outside diameter of the inner section, the outer section being received in the outer bore.

9. The piston cylinder assembly of claim 7 further comprising a collar fixed to the end of the pipe, said at least one peened area extending over the collar to positively hold the end of the pipe in the bore.

10. The piston cylinder assembly of claim 7 wherein the end of the pipe is positively held in the stepped bore by at least one peened area.

11. The piston cylinder assembly of claim 10 wherein said at least one peened area comprises at least one retaining tab.

* * * * *